US011529788B2

United States Patent
Seo

(10) Patent No.: US 11,529,788 B2
(45) Date of Patent: Dec. 20, 2022

(54) WATERPROOF SOUND-TRANSMITTING SHEET

(71) Applicant: AMOGREENTECH CO., LTD., Gimpo-si (KR)

(72) Inventor: In-Yong Seo, Seoul (KR)

(73) Assignee: AMOGREENTECH CO., LTD., Gyeonggi-do (KR)

( * ) Notice: Subject to any disclaimer, the term of this patent is extended or adjusted under 35 U.S.C. 154(b) by 180 days.

(21) Appl. No.: 16/314,813

(22) PCT Filed: Jun. 30, 2017

(86) PCT No.: PCT/KR2017/006992
§ 371 (c)(1),
(2) Date: Jan. 2, 2019

(87) PCT Pub. No.: WO2018/008910
PCT Pub. Date: Jan. 11, 2018

(65) Prior Publication Data
US 2019/0255801 A1    Aug. 22, 2019

(30) Foreign Application Priority Data

Jul. 8, 2016    (KR) .................. 10-2016-0086631

(51) Int. Cl.
*B32B 3/24*    (2006.01)
*B32B 3/26*    (2006.01)
(Continued)

(52) U.S. Cl.
CPC ............... *B32B 3/266* (2013.01); *B32B 5/02* (2013.01); *B32B 5/022* (2013.01); *B32B 7/12* (2013.01);
(Continued)

(58) Field of Classification Search
CPC .................. Y10T 428/24331; B32B 3/266
See application file for complete search history.

(56) References Cited

U.S. PATENT DOCUMENTS

| 10,132,004 B2 | 11/2018 | Lee et al. | |
| 2008/0307971 A1* | 12/2008 | Horie | D04H 1/4326 |
| | | | 95/287 |

(Continued)

FOREIGN PATENT DOCUMENTS

| CN | 103597849 A | 2/2014 |
| CN | 104302823 A | 1/2015 |

(Continued)

OTHER PUBLICATIONS

First Office Action issued in Chinese Patent Application No. 201780041510.5, dated Sep. 3, 2019.

*Primary Examiner* — William P Watkins, III
(74) *Attorney, Agent, or Firm* — CL Intellectual LLC

(57) ABSTRACT

A waterproof sound-transmitting sheet, which interposes an adhesive layer composed of a material having micropores formed therein, thus smoothing the flow of the air between a waterproof sound-transmitting layer and a support layer. The waterproof sound-transmitting sheet includes a waterproof sound-transmitting layer formed of a film having elasticity, an adhesive layer having one surface adhered to one surface of the waterproof sound-transmitting layer, and a support layer having one surface adhered to the other surface of the adhesive layer; and the adhesive layer includes a substrate having a pore formed therein and an adhesive agent formed on both surfaces of the substrate.

4 Claims, 2 Drawing Sheets

(51) Int. Cl.
*B32B 5/02* (2006.01)
*B32B 7/12* (2006.01)
*B32B 27/12* (2006.01)
*H04R 1/08* (2006.01)
*H04M 1/18* (2006.01)
*H04R 1/02* (2006.01)
*H04M 1/03* (2006.01)
*H04R 1/44* (2006.01)

(52) U.S. Cl.
CPC ............... *B32B 27/12* (2013.01); *H04M 1/03* (2013.01); *H04M 1/18* (2013.01); *H04R 1/02* (2013.01); *H04R 1/08* (2013.01); *B32B 2262/02* (2013.01); *B32B 2307/10* (2013.01); *B32B 2307/7265* (2013.01); *B32B 2457/00* (2013.01); *H04R 1/086* (2013.01); *H04R 1/44* (2013.01); *H04R 2499/11* (2013.01)

(56) References Cited

U.S. PATENT DOCUMENTS

| | | | |
|---|---|---|---|
| 2010/0247857 A1* | 9/2010 | Sanami | H04M 1/18 428/138 |
| 2014/0079268 A1 | 3/2014 | Karube et al. | |
| 2015/0259900 A1 | 9/2015 | Humphreys et al. | |
| 2020/0329289 A1* | 10/2020 | Kenaley | H04R 19/005 |

FOREIGN PATENT DOCUMENTS

| | | |
|---|---|---|
| JP | 2012-253481 A | 12/2012 |
| JP | 2016-34105 A | 3/2016 |
| KR | 2010-0041839 A | 4/2010 |
| KR | 10-1213140 B1 | 12/2012 |
| KR | 10-1436100 B1 | 9/2014 |
| KR | 10-1460303 B1 | 11/2014 |

* cited by examiner

[FIG. 1]
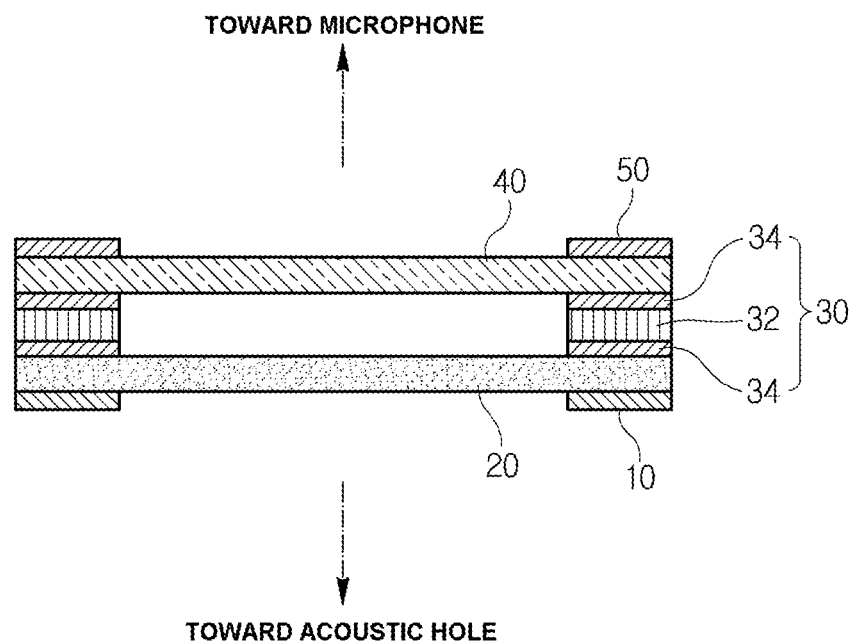

[FIG. 2]
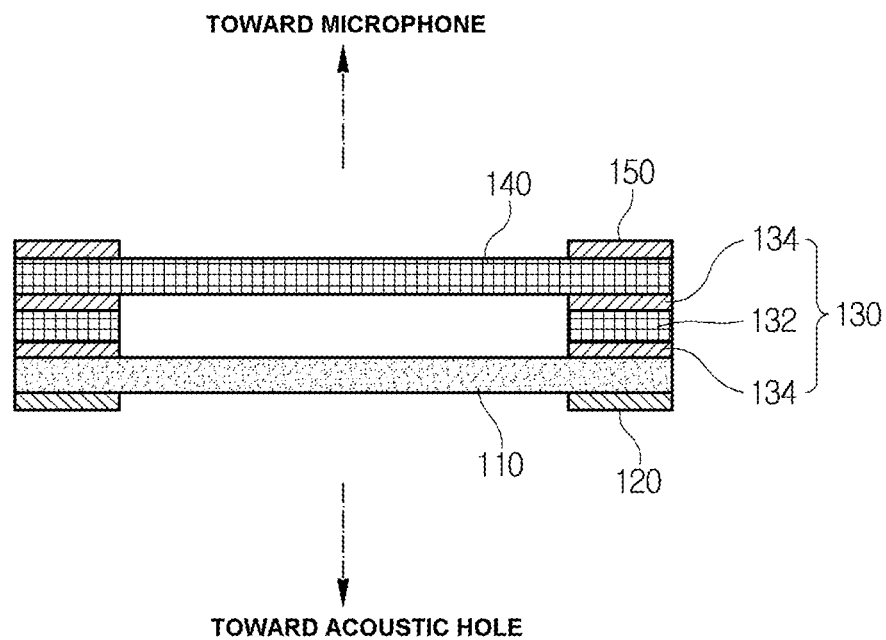
[FIG. 3]
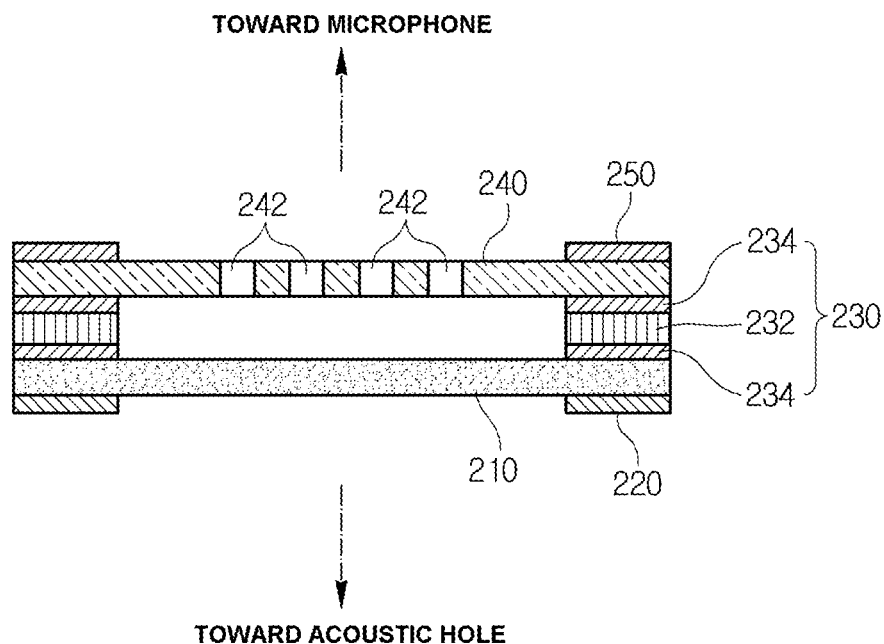

WATERPROOF SOUND-TRANSMITTING SHEET

CROSS-REFERENCE TO RELATED APPLICATIONS

This application is a National Stage of International patent application PCT/KR2017/006992, filed on Jun. 30, 2017, which claims priority to foreign Korean patent application No. 10-2016-0086631 filed on Jul. 8, 2016, the disclosures of which are incorporated by reference in their entirety.

FIELD OF THE INVENTION

The present disclosure relates to a waterproof sound-transmitting sheet, and more particularly, to a waterproof sound-transmitting sheet for increasing sound transmission efficiency and enhancing waterproof performance.

BACKGROUND

In recent years, mobile electronic appliances, such as a portable terminal, a digital camera, and a notebook, have increasingly been used. Such a mobile electronic appliance needs to have waterproof function because it is for portable. However, an acoustic hole for emitting sound is formed on a portion where a speaker, a microphone, etc. is installed, and water or dust permeates into the electronic appliance through the acoustic hole.

Accordingly, the acoustic hole is provided with a waterproof sound-transmitting sheet for passing through sound and blocking water or dust. Such a waterproof sound-transmitting sheet should be manufactured considering both waterproof performance and sound transmission efficiency.

Regarding the waterproof sound-transmitting sheet, Korean Laid-open Patent Publication No. 10-2010-0041839 (Apr. 22, 2010) discloses a configuration that is composed of a porous polytetrafluoroethylene film. However, there is a problem in that the conventional waterproof sound-transmitting film is composed of only a porous polytetrafluoroethylene film, such that it is stretched due to externally-applied impact or sound pressure as the use period becomes long.

At this time, there is a problem in that as the conventional waterproof sound-transmitting film is stretched by a pressure, the micropores of the porous film become larger to reduce waterproof performance, and when the pressure is maintained, a restoring force (elasticity) is reduced to reduce or lose acoustic performance.

In order to solve the problem, conventionally, a structure of forming the waterproof sound-transmitting film with a nonporous film is applied.

That is, as illustrated in FIG. 1, the conventional waterproof sound-transmitting sheet is composed of a first adhesive layer 10 adhered to a case of a portable terminal, a waterproof sound-transmitting film 20 formed of a nonporous film and having the lower surface adhered to the first adhesive layer 10, a second adhesive layer 30 having the lower surface adhered to the upper surface of the waterproof sound-transmitting film 20, a support layer 40 having the lower surface adhered to the upper surface of the second adhesive layer 30, and a third adhesive layer 50 having the lower surface adhered to the upper surface of the support layer 40, and having the lower surface attached to a microphone (or speaker) module.

At this time, the second adhesive layer 30 is formed of a substrate-type adhesive layer having an adhesive sheet 34 formed on both surfaces of a substrate 32 such as PET having no pores for securing the strength of the waterproof sound-transmitting sheet.

The conventional waterproof sound-transmitting sheet formed in the above-described structure is mounted in a portable terminal by adhering the first adhesive layer 10 to the case (i.e., the portion where the acoustic hole is formed) and then adhering the third adhesive layer 50 to the microphone (or speaker) module.

At this time, in the conventional waterproof sound-transmitting sheet, a pressure of the internal space formed between the waterproof sound-transmitting film and the support layer increases in the process of adhering to the microphone (or speaker) module. That is, as the conventional waterproof sound-transmitting sheet is composed of the waterproof sound-transmitting film of the nonporous film, the air that is present in the internal space does not escape to the outside in the process of adhering to the microphone (or speaker) module, thus increasing the pressure of the internal space.

Accordingly, there is a problem in that in the conventional waterproof sound-transmitting sheet, deformation of the waterproof sound-transmitting film is caused by an increase in the pressure of the internal space, and the sound-transmitting (i.e., sound transmission) effect is reduced by the deformation of the waterproof sound-transmitting film.

In addition, there is a problem in that since the conventional waterproof sound-transmitting sheet is not easy to flow (discharge) air in the internal space between the waterproof sound-transmitting film and the support layer, the waterproof sound-transmitting film is not restored quickly upon sound transmission, thus reducing sound-transmitting (sound transmission) effect.

SUMMARY OF THE INVENTION

The present disclosure is intended to solve the above conventional problems, and an object of the present disclosure is to provide a waterproof sound-transmitting sheet, which interposes the adhesive layer composed of a material having micropores formed therein between the waterproof sound-transmitting layer and the support layer so that the air smoothly flows between the waterproof sound-transmitting layer and the support layer.

In addition, another object of the present disclosure is to provide a waterproof sound-transmitting sheet, which interposes the adhesive layer composed of a material having micropores formed therein between the waterproof sound-transmitting layer and the support layer, and forms a plurality of discharge holes on the support layer formed of the nonporous film so that the air smoothly flows between the waterproof sound-transmitting layer and the support layer.

For achieving the objects of the present disclosure, a waterproof sound-transmitting sheet according to an embodiment of the present disclosure includes a waterproof sound-transmitting layer formed of a film having elasticity, a support layer disposed on one surface of the waterproof sound-transmitting layer, and an adhesive layer interposed between the waterproof sound-transmitting layer and the support layer to be adhered to the waterproof sound-transmitting layer and the support layer, and the adhesive layer includes a substrate having a pore formed therein and an adhesive agent formed on both surfaces of the substrate. At this time, the substrate may be formed of nonwoven fabric, and the nonwoven fabric may be formed of at least one among polyethylene terephthalate (PET), polypropylene (PP), polyethylene (PE), and Nylon.

The adhesive layer may have a hole formed therein to separate the waterproof sound-transmitting layer and the support layer, and may be disposed along the outer circumferences of the waterproof sound-transmitting layer and the support layer to form a spacing space between the waterproof sound-transmitting layer and the support layer.

For achieving the objects of the present disclosure, a waterproof sound-transmitting sheet according to another embodiment of the present disclosure includes a waterproof sound-transmitting layer formed of a film having elasticity, a support layer having a plurality of discharge holes formed therein and disposed on one surface of the waterproof sound-transmitting layer, and an adhesive layer interposed between the waterproof sound-transmitting layer and the support layer to be adhered to the waterproof sound-transmitting layer and the support layer. At this time, the support layer may be a nonporous film having the plurality of discharge holes formed therein.

The adhesive layer may include a substrate having a pore formed therein and an adhesive agent formed on both surfaces of the substrate. At this time, the substrate may be formed of nonwoven fabric, and the nonwoven fabric may be formed of at least one among polyethylene terephthalate (PET), polypropylene (PP), polyethylene (PE), and Nylon.

According to the present disclosure, it is possible for the waterproof sound-transmitting sheet to interpose the adhesive layer composed of a material having micropores formed therein between the waterproof sound-transmitting layer and the support layer, thus smoothing the flow of the air in the internal space between the waterproof sound-transmitting layer and the support layer.

In addition, it is possible for the waterproof sound-transmitting sheet to interpose the adhesive layer composed of a material having micropores formed therein between the waterproof sound-transmitting layer and the support layer, and to form the plurality of discharge holes on the support layer formed of the nonporous film, thus smoothing the flow of the air in the internal space between the waterproof sound-transmitting layer and the support layer.

In addition, it is possible for the waterproof sound-transmitting sheet to interpose the adhesive layer composed of a material having micropores formed therein between the waterproof sound-transmitting layer and the support layer, thus preventing the pressure of the internal space formed between the waterproof sound-transmitting layer and the support layer when attached to the microphone (or speaker) module from being increased.

In addition, it is possible for the waterproof sound-transmitting sheet to interpose the adhesive layer composed of a material having micropores formed therein between the waterproof sound-transmitting layer and the support layer, and to form the plurality of discharge holes on the support layer formed of the nonporous film, thus preventing the pressure of the internal space formed between the waterproof sound-transmitting layer and the support layer when attached to the microphone (or speaker) module from being increased.

In addition, it is possible for the waterproof sound-transmitting sheet to prevent the pressure of the internal space formed between the waterproof sound-transmitting layer and the support layer from being increased, thus preventing the waterproof sound-transmitting layer from being deformed.

In addition, it is possible for the waterproof sound-transmitting sheet to prevent the pressure of the internal space formed between the waterproof sound-transmitting layer and the support layer from being increased, thus preventing sound-transmitting (i.e., sound transmission) performance from being reduced by the deformation of the waterproof sound-transmitting layer.

In addition, it is possible for the waterproof sound-transmitting sheet to interpose the adhesive layer composed of a material having micropores formed therein between the waterproof sound-transmitting layer and the support layer, thus smoothing the flow (discharge) of the air in the internal space between the waterproof sound-transmitting layer and the support layer to increase a restoring speed of the waterproof sound-transmitting layer upon sound transmission.

In addition, it is possible for the waterproof sound-transmitting sheet to interpose the adhesive layer composed of a material having micropores formed therein between the waterproof sound-transmitting layer and the support layer, and to form the plurality of discharge holes on the support layer formed of the nonporous film, thus smoothing the flow (discharge) of the air in the internal space between the waterproof sound-transmitting layer and the support layer to increase a restoring speed of the waterproof sound-transmitting layer upon sound transmission.

Accordingly, it is possible for the waterproof sound-transmitting sheet to smooth the flow (discharge) of the air in the internal space between the waterproof sound-transmitting layer and the support layer to increase a restoring speed of the waterproof sound-transmitting layer upon sound transmission, thus smoothing the movement of the waterproof sound-transmitting layer by sound pressure to enhance the sound-transmitting (sound transmission) performance.

BRIEF DESCRIPTION OF THE DRAWINGS

FIG. 1 is a diagram for explaining a conventional waterproof sound-transmitting sheet.

FIG. 2 is a diagram for explaining a waterproof sound-transmitting sheet according to a first embodiment of the present disclosure.

FIG. 3 is a diagram for explaining a waterproof sound-transmitting sheet according to a second embodiment of the present disclosure.

DETAILED DESCRIPTION

Hereinafter, the most preferred embodiment of the present disclosure will be described with reference to the accompanying drawings so that those skilled in the art to which the present disclosure pertains may easily practice the technical spirit of the present disclosure. First, in adding reference numerals to the components in each drawing, it is to be noted that the same components are denoted by the same reference numerals even though they are illustrated in different drawings. In addition, in the following description of the present disclosure, a detailed description of known configurations or functions will be omitted when it is determined to obscure the subject matter of the present disclosure.

Referring to FIG. 1, a waterproof sound-transmitting sheet 100 according to a first embodiment of the present disclosure is configured to include a waterproof sound-transmitting layer 110, a first adhesive layer 120, a second adhesive layer 130, a support layer 140, and a third adhesive layer 150.

The waterproof sound-transmitting layer 110 is formed of a thin film in a predetermined shape. At this time, the waterproof sound-transmitting layer 110 is formed of a thin film in various shapes such as a circular shape, an elliptical shape, a square shape, and a hexagonal shape according to an acoustic hole, an internal coupling structure, etc. of an applicable device.

Generally, since the applicable device to which the waterproof sound-transmitting sheet 100 is applied has an acoustic hole in a very small circular shape, the waterproof sound-transmitting layer 110 is mainly formed in a circular shape or an elliptical shape.

In addition, the waterproof sound-transmitting layer 110 may be formed of a thin film having a thickness of about 5 µm to 100 µm according to sound-transmitting and waterproof performance required by the applicable device. At this time, the waterproof sound-transmitting layer 110 may also be formed in a thickness of 5 µm or less and 100 µm or more considering a thickness of the applicable device. Herein, the waterproof sound-transmitting layer 110 has the highest sound-transmitting performance at about 5 µm.

The waterproof sound-transmitting layer 110 may be composed of a nonporous membrane formed through electrospinning in order to provide waterproof performance at a high water pressure. For example, the waterproof sound-transmitting layer 110 may be formed in a high elastic nonporous film shape by electrospinning a polymer material, forming a polymer material layer on a web, and then heat-treating the polymer material layer to melt the structure on the web.

Herein, the polymer material may use aromatic polyesters such as polyamide, polyimide, polyamideimide, poly (metaphenylene isophthalamide), polysulfone, polyetherketone, polyetherimide, polyethylene terephthalate, polytrimethylene terephthalate, and polyethylene naphthalate, polyphosphazenes such as polytetrafluoroethylene, polydiphenoxaphospazene, and poly {bis[2-(2-metboxyethoxy) phosphazene]}, polyurethane copolymers containing polyurethane and polyetherurethane, cellulose acetate, cellulose acetate butyrate, cellulose acetate propionate, etc. In addition, it may use polyvinylidene fluoride (PVDF), poly (vinylidene fluoride-co-hexafluoropropylene), perfluoropolymers, polyvinyl chloride or polyvinylidene chloride, and copolymers thereof, and polyethyleneglycol derivatives containing polyethyleneglycol dialkyl ether and polyethyleneglycol dialkyl ester, polyoxides containing poly (oxymethylene-oligo-oxyethylene), polyethylene oxide, and polypropylene oxide, polyacrylonitrile copolymers containing polyvinyl acetate, poly (vinylpyrrolidone-vinyl acetate), polystyrene and polystyrene acrylonitrile copolymers, polyacrylonitrile, polyacrylonitrile methyl methacrylate copolymers, poly methyl methacrylate, polymethyl methacrylate copolymer and a mixture thereof.

The waterproof sound-transmitting layer 110 is formed by electrospinning so that the thickness thereof is easily adjusted. Particularly, the thickness of the waterproof sound-transmitting layer 110 is formed by using an electrospinning process easily and thinly, thus forming the waterproof sound-transmitting sheet 100 having entire excellent sound-transmitting performance. The porous type waterproof sound-transmitting sheet 100 is relatively less sensitive to the thickness of the sheet because it transmits sound through the pore. On the contrary, the nonporous type waterproof sound-transmitting sheet 100 is required to have a thin thickness of the sheet so that sound vibration on one surface thereof may be transmitted to the other surface thereof more effectively.

In addition, since the waterproof sound-transmitting layer 110 is formed in a nonporous type, it is possible to implement waterproof performance higher than that of the waterproof sound-transmitting sheet 100 including the pore type waterproof sound-transmitting layer 110.

The waterproof sound-transmitting layer 110 may also be composed of a high elasticity (high stretch-shrinkage performance) and nonporous material manufactured by a method other than electrospinning in order to provide waterproof performance at a high water pressure. For example, the waterproof sound-transmitting layer 110 may be formed of a high elastic material such as latex, polyurethane (PU), or Thermoplastic Poly Urethane (TPU), and may be formed in a nonporous film shape in order to maintain waterproof performance at a pressure of about 1 atm or more.

The first adhesive layer 120 is formed of a thin film in a predetermined shape having a hole therein. The first adhesive layer 120 has the lower surface adhered to the acoustic hole formed in the applicable device, and has the upper surface adhered to the lower surface of the waterproof sound-transmitting layer 110. At this time, the first adhesive layer 120 may be formed of a thin film in various shapes such as a circular shape, an elliptical shape, a square shape, and a hexagonal shape according to the shape of the waterproof sound-transmitting layer 110.

The second adhesive layer 130 is formed of a thin film in a predetermined shape having a hole therein. That is, the second adhesive layer 130 may be formed of a thin film in various shapes such as a circular shape, an elliptical shape, a square shape, and a hexagonal shape according to the shapes of the waterproof sound-transmitting layer 110 and the support layer 140. At this time, the second adhesive layer 130 has a hole for sound-transmitting formed therein.

Accordingly, the second adhesive layer 130 is disposed along the outer circumferences of the waterproof sound-transmitting layer 110 and the support layer 140 to form a spacing space (i.e., hole) between the waterproof sound-transmitting layer 110 and the support layer 140.

The second adhesive layer 130 is formed of a thin film having a predetermined thickness for securing a spacing distance between the waterproof sound-transmitting layer 110 and the support layer 140. That is, the second adhesive layer 130 has the lower surface adhered to the upper surface of the waterproof sound-transmitting layer 110, and has the upper surface adhered to the lower surface of the support layer 140 to be interposed between the waterproof sound-transmitting layer 110 and the support layer 140. At this time, the second adhesive layer 130 may be formed to have a thickness of about 50 µm to 200 µm for securing a spacing interval between the waterproof sound-transmitting layer 110 and the support layer 140.

The second adhesive layer 130 is formed of a substrate-type adhesive layer having an adhesive agent formed on both surfaces of the substrate. At this time, the second adhesive layer 130 is composed of a pore type material having a plurality of micropores that pass through air and do not pass through water in order to constitute an airflow passage for discharging the air in the internal space formed between the waterproof sound-transmitting layer 110 and the support layer 140, or sucking the outside air into the internal space.

The substrate is composed of a porous material having a plurality of pores formed therein such as nonwoven fabric formed of a material such as polyethylene terephthalate (PET), polypropylene (PP), polyethylene (PE), or Nylon.

The support layer 140 is formed of a thin film in a predetermined shape. At this time, the support layer 140 is formed of a thin film in various shapes such as a circular shape, an elliptical shape, a square shape, and a hexagonal shape according to the acoustic hole, the internal coupling structure, etc. of the applicable device.

The support layer 140 may be formed of a thin film having a thickness of about 10 μm to 100 μm according to sound-transmitting and waterproof performance required by the applicable device. At this time, the support layer 140 has the highest acoustic performance when it is formed at a thickness of about 151 μm or more and 20 μm or less.

Meanwhile, when the support layer 140 is formed of a thin film of nonwoven fabric material it may have a diameter of the fiber constituting the nonwoven fabric formed to be about 1 μm or more and 10 μm or less. Herein, the support layer 140 may be generally formed of a thin film of nonwoven fabric material composed of the fiber having a diameter of about 5 μm.

The support layer 140 is composed of a porous material having a plurality of pores formed therein for sound-transmitting of a microphone or a speaker. For example, the support layer 140 may be composed of a porous material having a plurality of pores formed therein such as nonwoven fabric formed of a material such as polyethylene terephthalate (PET), polypropylene (PP), polyethylene (PE), or Nylon. Herein, the support layer 140 has a plurality of pores having the size (diameter) of about 2 μm to 20 μm formed therein.

At this time, in air permeability of 100 cfm or less, sound may not permeate and thereby acoustic loss occurs, such that the support layer 140 preferably has a plurality of pores to have the air permeability of about 100 cfm or more.

Meanwhile, when a large amount of pores are formed, the movement of the support layer 140 may be caused by sound pressure. In this case, the collision with the waterproof sound-transmitting layer 110 stretched by applying water pressure thereto occurs, such that the support layer 140 may prevent the movement due to sound pressure, and preferably forms pores enough to maintain the air permeability of 100 cfm or more.

The support layer 140 is disposed to be spaced at a predetermined interval apart from the waterproof sound-transmitting layer 110 in order to prevent the waterproof sound-transmitting layer 110 from being stretched by a certain level or more by applying water pressure thereto. At this time, the support layer 140 forms a spacing interval with the waterproof sound-transmitting layer 110 by the thickness of the second adhesive layer.

The third adhesive layer 150 is formed of a thin film in a predetermined shape having a hole therein. The third adhesive layer 150 has the lower surface adhered to the upper surface of the support layer 140, and has the upper surface adhered to the acoustic hole formed in the case of the portable terminal. At this time, the third adhesive layer 150 may be formed of a thin film in various shapes such as a circular shape, an elliptical shape, a square shape, and a hexagonal shape according to the shape of the waterproof sound-transmitting layer 110.

As described above, it is possible for the waterproof sound-transmitting sheet to interpose the adhesive layer composed of a material having micropores formed therein between the waterproof sound-transmitting layer and the support layer, thus smoothing the flow of the air in the internal space between the waterproof sound-transmitting layer and the support layer.

In addition, it is possible for the waterproof sound-transmitting sheet to interpose the adhesive layer composed of a material having micropores formed therein between the waterproof sound-transmitting layer and the support layer, thus preventing the pressure of the internal space formed between the waterproof sound-transmitting layer and the support layer when attached to the microphone (or speaker) module from being increased.

In addition, it is possible for the waterproof sound-transmitting sheet to prevent the pressure of the internal space formed between the waterproof sound-transmitting layer and the support layer from being increased, thus preventing the waterproof sound-transmitting layer from being deformed.

In addition, it is possible for the waterproof sound-transmitting sheet to prevent the pressure of the internal space formed between the waterproof sound-transmitting layer and the support layer from being increased, thus preventing sound-transmitting (i.e., sound transmission) performance from being reduced by deformation of the waterproof sound-transmitting layer.

In addition, it is possible for the waterproof sound-transmitting sheet to interpose the adhesive layer composed of a material having micropores formed therein between the waterproof sound-transmitting layer and the support layer, thus smoothing the flow (discharge) of the air in the internal space between the waterproof sound-transmitting layer and the support layer to increase a restoring speed of the waterproof sound-transmitting layer upon sound transmission. That is, the waterproof sound-transmitting sheet may quickly restore sensitivity loss caused by an increase in the internal pressure upon pressurization as compared to the conventional waterproof sound-transmitting sheet.

Accordingly, it is possible for the waterproof sound-transmitting sheet to smooth the flow (discharge) of the air in the internal space between the waterproof sound-transmitting layer and the support layer to increase a restoring speed of the waterproof sound-transmitting layer upon sound transmission, thus smoothing the movement of the waterproof sound-transmitting layer by sound pressure to enhance sound-transmitting (sound transmission) performance.

Referring to FIG. 3, a waterproof sound-transmitting sheet 200 according to a second embodiment of the present disclosure is configured to include a waterproof sound-transmitting layer 210, a first adhesive layer 220, a second adhesive layer 230, a support layer 240, and a third adhesive layer 250.

Herein, since the waterproof sound-transmitting layer 210, the first adhesive layer 220, the second adhesive layer 230, and the third adhesive layer 250 are the same as the waterproof sound-transmitting layer 110, the first adhesive layer 120, the second adhesive layer 130, and the third adhesive layer 150, a detailed description thereof will be omitted.

Unlike the support layer 140 of the first embodiment, the support layer 240 is formed of a resin (e.g., PET, etc.) of a nonporous film in order to reinforce the strength of the waterproof sound-transmitting sheet 200. At this time, since the support layer 240 is formed of a nonporous film, a plurality of air-permeable discharge holes 242 are formed for sound-transmitting (sound transmission) therein.

At this time, since the support layer 240 is formed of a nonporous film, the support performance of the waterproof sound-transmitting layer 210 increases as compared to that of the first embodiment formed of a porous film, but there is no airflow passage therein, such that the pressure of the internal space formed between the waterproof sound-transmitting layer 210 and the support layer 240 increases when adhered to a case of a portable terminal or a microphone (or speaker) module thereof.

In this case, since the waterproof sound-transmitting layer 210 or the support layer 240 is deformed or sound transmission performance is reduced, the support layer 240 has the plurality of discharge holes 242 for discharging the air in the internal space formed therein.

At this time, the plurality of discharge holes 242 are disposed in a line to be spaced at a predetermined interval apart from each other. For example, as illustrated in FIG. 3, four discharge holes 242 having a diameter of about 50Φ may also be disposed in a line to be spaced apart from each other.

Of course, the plurality of discharge holes 242 may be disposed in multiple rows or multiple columns to be spaced at a predetermined interval apart from each other.

As described above, it is possible for the waterproof sound-transmitting sheet to interpose the adhesive layer composed of a material having micropores formed therein between the waterproof sound-transmitting layer and the support layer, and to form the plurality of discharge holes on the support layer formed of the nonporous film, thus smoothing the flow of the air in the internal space between the waterproof sound-transmitting layer and the support layer.

In addition, it is possible for the waterproof sound-transmitting sheet to interpose the adhesive layer composed of a material having micropores formed therein between the waterproof sound-transmitting layer and the support layer, and to form the plurality of discharge holes on the support layer formed of the nonporous film, thus preventing the pressure of the internal space formed between the waterproof sound-transmitting layer and the support layer when attached to the microphone (or speaker) module from being increased.

In addition, it is possible for the waterproof sound-transmitting sheet to prevent the pressure of the internal space formed between the waterproof sound-transmitting layer and the support layer from being increased, thus preventing the waterproof sound-transmitting layer from being deformed.

In addition, it is possible for the waterproof sound-transmitting sheet to prevent the pressure of the internal space formed between the waterproof sound-transmitting layer and the support layer from being increased, thus preventing sound-transmitting (i.e., sound transmission) performance from being reduced by deformation of the waterproof sound-transmitting layer.

In addition, it is possible for the waterproof sound-transmitting sheet to interpose the adhesive layer composed of a material having micropores formed therein between the waterproof sound-transmitting layer and the support layer, and to form the plurality of discharge holes on the support layer formed of the nonporous film, thus smoothing the flow (discharge) of the air in the internal space between the waterproof sound-transmitting layer and the support layer to increase a restoring speed of the waterproof sound-transmitting layer upon sound transmission.

Accordingly, it is possible for the waterproof sound-transmitting sheet to smooth the flow (discharge) of the air in the internal space between the waterproof sound-transmitting layer and the support layer to increase a restoring speed of the waterproof sound-transmitting layer upon sound transmission, thus smoothing the movement of the waterproof sound-transmitting layer by sound pressure to enhance sound-transmitting (sound transmission) performance.

As described above, although preferred embodiments according to the present disclosure have been described, it is to be understood that they may be modified into various forms, and various modifications and changes thereof may be embodied by those skilled in the art without departing from the scope of the present disclosure.

The invention claimed is:

1. A waterproof sound-transmitting sheet, comprising:
   a waterproof sound-transmitting layer formed of a nonporous film having elasticity;
   a support layer which is a nonporous film having a plurality of discharge holes formed therein and disposed on one surface of the waterproof sound-transmitting layer;
   a first adhesive layer adhered to the other surface of the waterproof sound-transmitting layer;
   a second adhesive layer interposed between the waterproof sound-transmitting layer and the support layer to be adhered to the one surface of the waterproof sound-transmitting layer and one surface of the support layer; and
   a third adhesive layer disposed on the other surface of the support layer,
   wherein the second adhesive layer having a plurality of pores, and
   wherein the plurality of pores of the second adhesive layer constitutes an airflow passage that makes air in an internal space formed among the waterproof sound-transmitting layer, the second adhesive layer, and the support layer flow outside of the internal space.

2. The waterproof sound-transmitting sheet of claim 1, wherein the second adhesive layer comprises
   a substrate having the pore formed therein; and
   an adhesive agent formed on both surfaces of the substrate.

3. The waterproof sound-transmitting sheet of claim 2, wherein the substrate of the second adhesive layer is formed of nonwoven fabric.

4. The waterproof sound-transmitting sheet of claim 3, wherein the nonwoven fabric is formed of at least one among polyethylene terephthalate (PET), polypropylene (PP), polyethylene (PE), and Nylon.

* * * * *